April 30, 1963 W. H. NEWELL 3,087,333
INERTIAL NAVIGATION SYSTEM
Filed Nov. 30, 1956 3 Sheets-Sheet 3
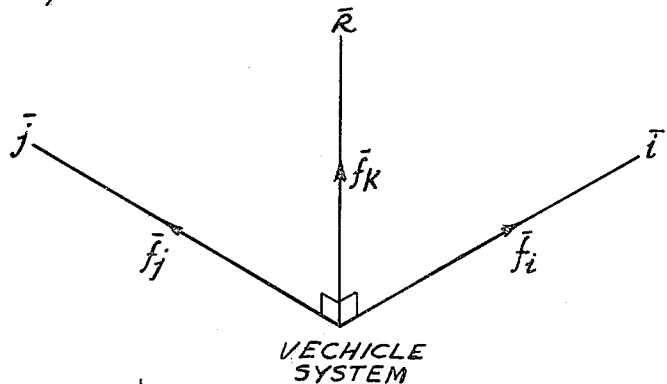
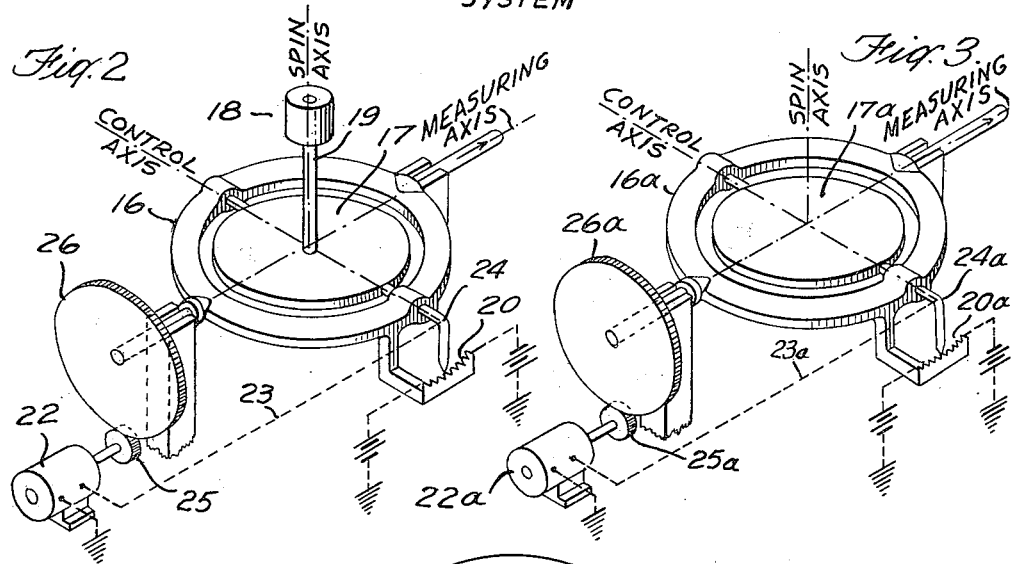
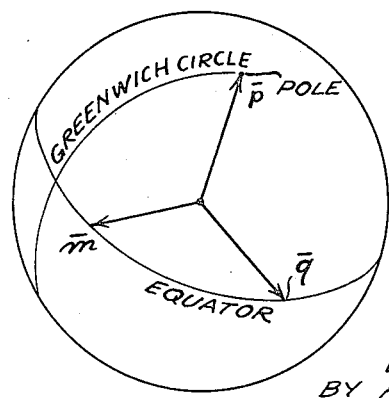
INVENTOR
WILLIAM H. NEWELL
BY
ATTORNEY United States Patent Office 3,087,333
Patented Apr. 30, 1963

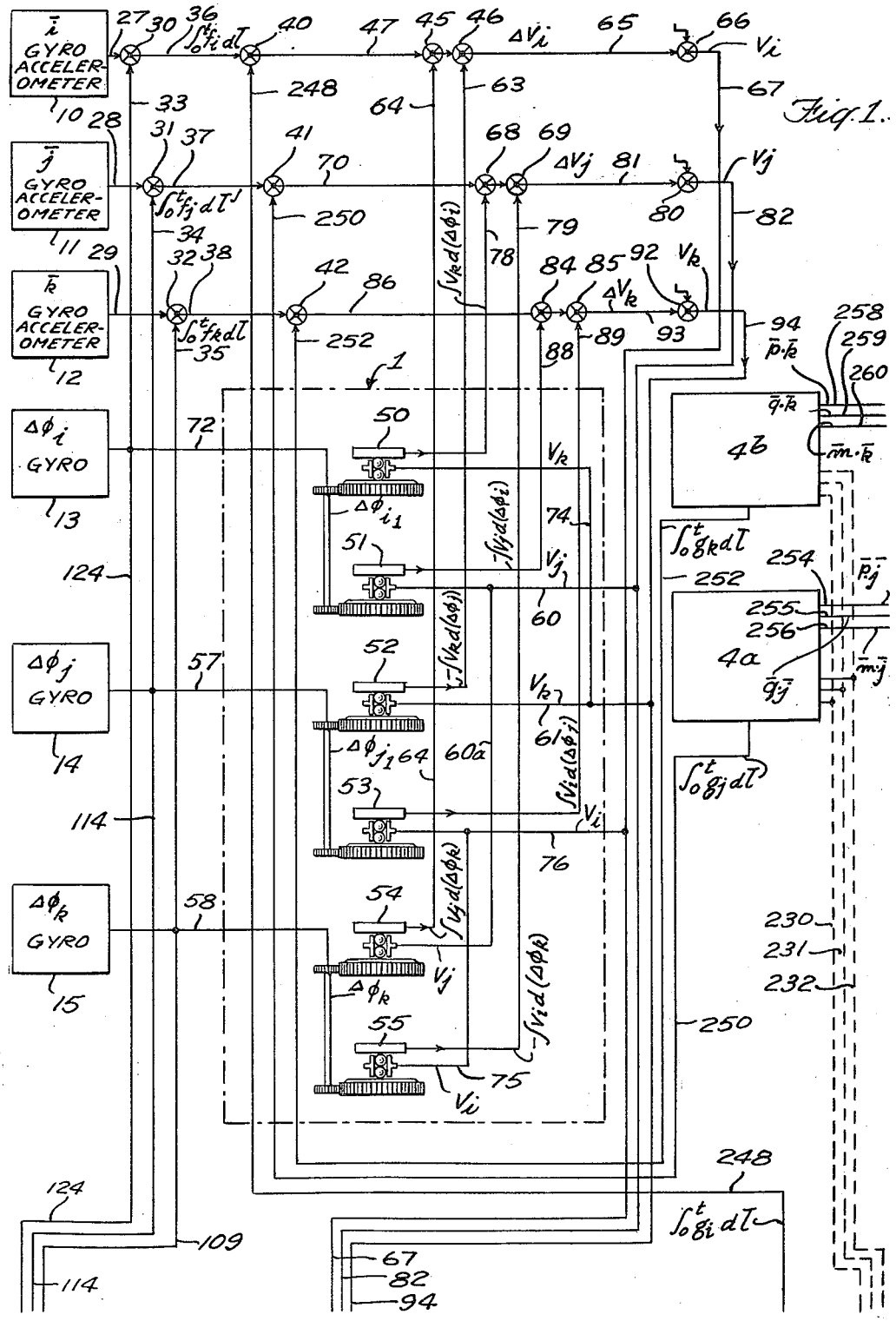

3,087,333
INERTIAL NAVIGATION SYSTEM
William H. Newell, Mount Vernon, N.Y., assignor to Sperry Rand Corporation, Ford Instrument Company Division, Long Island City, N.Y., a corporation of Delaware
Filed Nov. 30, 1956, Ser. No. 625,544
10 Claims. (Cl. 73—178)

The invention relates to a navigation computer which employs motion indicating instruments especially designed and arranged so as to improve the operating efficiency of the computer while the vehicle on which it is borne is maneuvering.

The conventional stabilization gyros and linear accelerometers, used in conjunction with navigation computers, are attached to a gimbal mounted platform and are therefore subject to a condition known as gimbal lock which causes failure of the gyro units and thereby restricts the desired complete freedom of vehicle motion. The present invention contemplates the provision of stabilization gyros and integrating gyro accelerometers which permit complete freedom of vehicle motion and which do not require a gimbal supported mounting platform. This is achieved by the use of three single integrating gyro accelerometers and three single degree of freedom stabilization gyros, one gyro accelerometer and one stabilization gyro being attached to the vehicle with their respective measuring axes aligned parallel to each of three mutually orthogonal axes or reference lines fixed in and to the vehicle.

Each accelerometer furnishes an output whose change is the indicated change of vehicle velocity in the instantaneous measuring direction. Since the indicated velocity increment contains certain effects which are not wanted and does not contain an effect which is wanted, a part of this invention relates to the means of processing the accelerometer output information by means of output information from the stabilization gyro units, in order to obtain the velocity vector of the vehicle with respect to inertial space expressed in terms of components in the coordinate system, consisting of the measuring axes, attached to the vehicle. This invention also provides means for resolving the components of vehicle velocity with respect to inertial space in the rotating vehicle coordinate system into an, essentially, inertial and orthogonal coordinate system having an origin at the center of the earth and having one axis parallel to the earth's axis of rotation, the two remaining axes being in the equatorial plane. Additional means are also provided for the determination of vehicle position components in the inertial coordinate system, and from these components and a clock, vehicle angular position with respect to the rotating earth can be expressed as latitude and longitude. Means are also provided for using these vehicle position components to resolve the gravitational attraction vector $\bar{g}$ in the inertial coordinate system, to transform the $g$ components from the inertial to the vehicle coordinate system, to integrate the $g$ components in the vehicle system and thereby obtain the quantities necessary to correct the accelerometer outputs for the unsensed gravitational attraction effect.

The actions of the three stablization gyros are similar to each other in every respect. Considering one of the stabilization gyro units, the action is such that the angular velocity component of the stabilization gyro frame about the measuring axis is maintained at zero with respect to inertial space. As seen from inside the vehicle the gyro unit frame will appear to rotate with an angular velocity with respect to the vehicle which is equal and opposite to the angular velocity of the vehicle with respect to inertial space. Accordingly, the angular position or indication of the gyro frame with respect to the vehicle is the time integral of the component of vehicle angular velocity about the measuring axis, in other words, the total rotation of the vehicle about this particular measuring axis. This is the angular quantity required to correct the gyro accelerometer output, associated with this measuring axis, for vehicle rotation about this particular axis. The single integrating gyro accelerometer output is an angular velocity with respect to inertial space of the gyro unit frame, about the measuring axis, the angular velocity of precession being proportional to the component of specific force applied to the accelerometer mass in the measuring direction. Hence, the angular rotation of the gyro accelerometer unit frame with respect to the vehicle must be corrected for the rotation of the vehicle, relative to inertial space, about the measuring axis as given by the output of the stabilization gyro about this same axis.

The integrating gyro accelerometer unit has no direct knowledge of the space direction in which the integration of specific force component is taking place, therefore, means are provided for utilizing direction information from the stabilization gyros and for correcting the gyro accelerometer outputs for effects of vehicle rotation. Since only the integration of linear acceleration is desired means are also provided to correct the integrating gyro accelerometer outputs for gravitational effects.

Although the action and performance of the single integrating gyro accelerometer unit and the single degree of freedom stabilization gyro unit is well-known, it will be necessary to review the salient features of their action for a proper understanding of certain parts of this invention. For purposes of this description the performance of the gyro accelerometer as well as the stabilization gyro will be considered ideal. This description neglects therefore the small dynamic errors inherent in any sensing unit, and also the small effects due to location of the measuring units in the vehicle. Thus, the accelerometer responds essentially to the measuring axis component of the specific force vector $\bar{f}$ applied to the accelerometer weight as if it were at the vehicle center of mass. Likewise, the stabilization gyro responds essentially to the measuring axis component of the angular velocity vector $\bar{\omega}$ of the vehicle with respect to inertial space.

FIGS. 1 and 1A show a general schematic of the inertial navigation computer;

FIG. 2 is a schematic of the single integrating gyro accelerometer employed in the computer;

FIG. 3 is a schematic of the stabilization gyro used in the computer;

FIG. 4 is a diagram showing the mutually orthogonal coordinate axes of the moving system attached to the vehicle; and FIG. 5 is a diagram showing the non-rotating axes of the inertial referencing system.

Figure 1A:
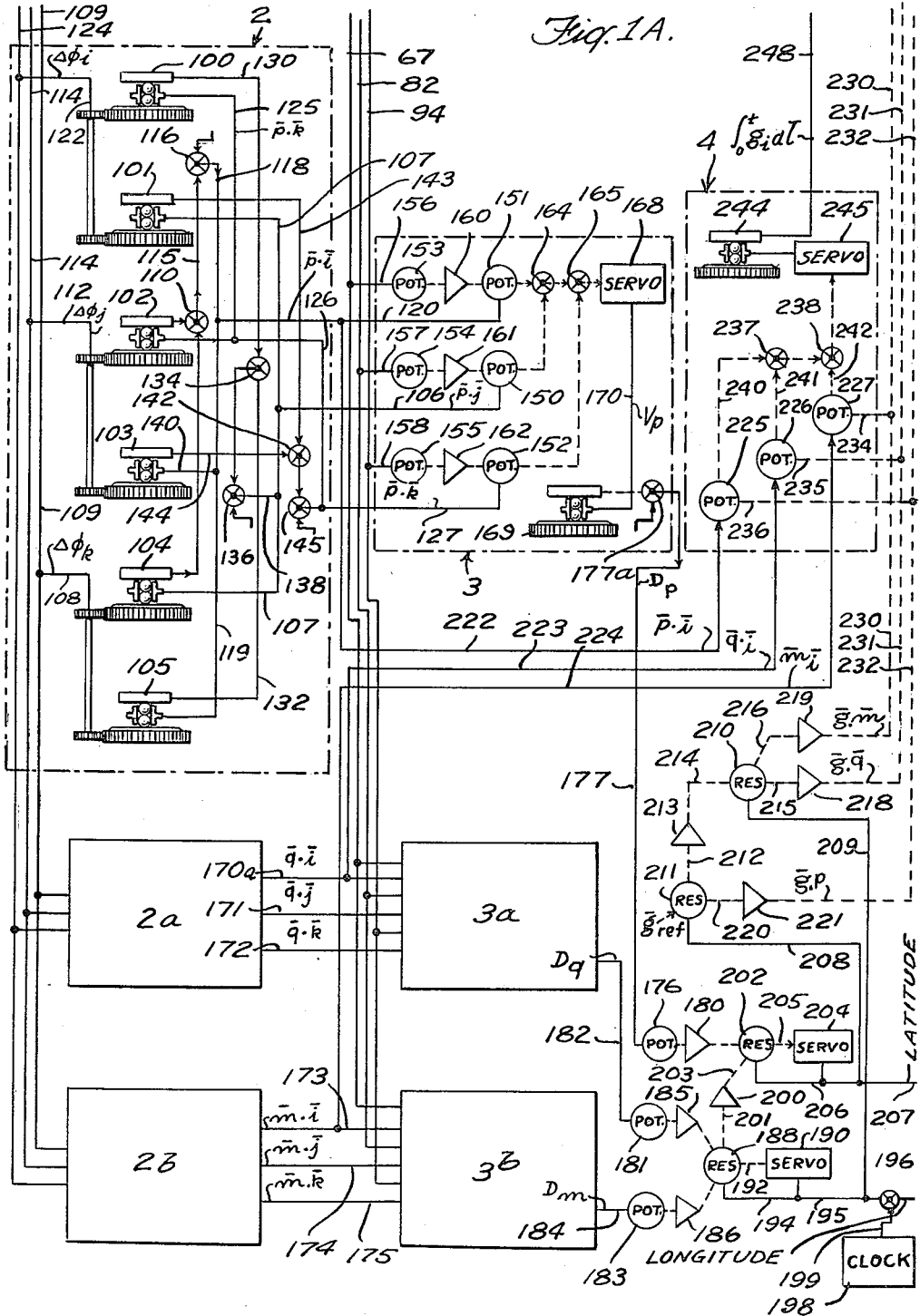

In the drawings mechanical connections are represented by continuous lines and electrical connections by dotted lines. Referring to FIG. 1, integrating gyro accelerometers 10, 11 and 12 are provided to yield the time integral of the measuring axis components of specific force, namely, $$\int_0^t f_i d\tau, \int_0^t f_j d\tau$$

and $$\int_0^t f_k d\tau$$

respectively where $f_i$, $f_j$, and $f_k$ are the components of the specific force vector $\bar{f}$, applied to the sensing mass 18 of the accelerometers, in the mutually orthogonal measuring directions given by the unit vectors $\bar{i}$, $\bar{j}$ and $\bar{k}$ attached to the rotatable vehicle. These integral components could also be designated as increments of velocity components. Similarly stabilization gyros 13, 14 and 15 are mounted along the same respective axes of the vehicle. As illustrated in FIG. 4 the three axes are established mutually at right angles to each other and constitute a system of coordinates designated the vehicle coordinate system with the axis $\bar{i}$ disposed longitudinally through the center of the vehicle, the axis $\bar{j}$ disposed normal to its longitudinal center line and axis $\bar{k}$ disposed normal to the plane defined by the axes $\bar{i}$ and $\bar{j}$. As schematically shown in FIG. 2 the gyro accelerometers are of the single intergating type having a single degree of unlimited freedom about its measuring axis and a limited amount of freedom about a control axis which is normal thereto. The gyro frame 16 rotatably supports gyro case 17 containing a gyro wheel with spin axis normal to the control axis and essentially normal to the measuring axis. A weight 18 is mounted centrally on the spin axis and off center of the gyro case 17 by means of a rod 19 which connects the case 17 and the weight 18. A battery powered potentiometer 20 is supported by the frame 16 which controls the energy delivered to motor 22 on lead 23 by means of pick-off 24, the position of which is determined by the rotation of the gyro case 17 about the control axis. The frame 16 is caused to rotate about the measuring axis, along which it is mounted, by means of gears 25 and 26. The action of the single integrating gyro acclerometer may be described briefly as follows. The accelerometer sensing mass 18 inertially opposes the applied specific force vector $\bar{f}$ with an equal and opposite inertia reaction force vector $-\bar{f}$. The vector $\bar{f}$ may be resolved into components along the spin axis, the control axis, and the measuring axis of the gyro accelerometer. The action of the spin axis component of specific force is only to load the support bearings of the accelerometer unit without applying any torque. The action of the control axis component of specific force is to apply a torque to the gyro case about an axis normal to the spin and control axes. This causes precession of the gyro about the control axis, displacement of the pick-off 24, and application of voltage to the servo motor 22, which applies torque to frame 16 in a direction to oppose the applied torque and thereby returning the pick-off to a position just sufficient to allow torque cancellation. No sensible rotation of frame 16 about the measuring axis occurs therefore due to the presence of the control axis component of specific force. The remaining component of specific force, namely the measuring axis component, results in a torque applied to the gyro case about the control axis. As a result of this torque the gyro spin axis attempts to precess, into alignment with the torque vector, about an axis perpendicular to the spin and control axis but is prevented initially from doing so by the inertia of frame 16 and the reflected inertia of frame drive motor 22 and associated drive gearing 25, 26. The inertia reaction of frame 16 therefore initially applies, through the control axis support bearings, a torque to the gyro case about the measuring axis or about an axis essentially perpendicular to the spin and control axes. This reaction torque causes initial precession of the gyro and gyro case about the control axis thereby offsetting the pick-off 24 and supplying the servo motor 22 with a voltage of proper polarity to drive the frame in a direction to null the bearing reaction torque. In the presence of a measuring axis component of specific force, the torque about the measuring axis can only be nulled if the gyro is allowed to precess about the measuring axis with an angular velocity imposed by and proportional to the measuring axis component of specific force. Since the indicated rotation of frame 16 is with respect to the vehicle frame, the rotation of the vehicle with respect to inertial space about the measuring axis will be determined in the manner hereinafter described.

The stabilization gyro unit shown in FIG. 3 is similar to the integrating gyro accelerometer without the unbalanced weight. Its corresponding parts are given the subscript $a$.

Any changes in the outputs of accelerometers 10, 11 and 12 are received by shafts 27, 28 and 29, respectively, as the indicated increments of the velocity component as measured by the accelerometers. The indicated velocity increments include false increments of velocity, representing the direct rotative motion of the vehicle. These unwanted increments are continuously subtracted by the differentials 30, 31 and 32 which receive the gyro outputs on shafts 33, 34 and 35, respectively. The changes in the outputs of the differentials 30, 31 and 32 will, therefore, represent the true velocity increment output of the respective gyro accelerometers. As is hereinafter explained the differential outputs on shafts 36, 37 and 38 are corrected for gravity effect by differentials 40, 41 and 42 which are respectively connected to the latter shafts.

The integrator arrangement in box 1 constitutes a vector stabilizing system and is employed to convert the increments of the velocity component as given by the integrating accelerometers in the vehicle coordinate system to increments of the inertial velocity component also in the vehicle coordinate system so that the inertial space velocity components corresponding to the instantaneous position of the vehicle axes are obtained.

The integrating gyro accelerometers measure the time integral of specific force in the measuring direction. These components do not include the effects of gravitational attraction.

The fundamental equation of motion of the center of mass A of an acceleration sensing mass $m$ is $$\bar{a} - \bar{g} = \bar{f} \qquad (1)$$

where $\bar{a}$ is the linear acceleration vector of the point A with respect to inertial space, $\bar{g}$ is the linear acceleration due to the force of gravitational attraction, and $\bar{f}$ is the resultant specific force vector applied to A resulting, for example, from thrust and aerodynamic forces applied to the vehicle.

The linear acceleration vector $\bar{a}$ is by definition the time rate of change of the velocity vector $\bar{V}$ of the sensing point mass A with respect to inertial space so that $$\bar{a} = \frac{d\bar{V}}{dt} \qquad (2)$$

where the vectors $\bar{a}$ and $\bar{V}$ may be expressed in terms of components in an arbitrary coordinate system and in particular in a right-handed orthogonal coordinate system attached to the rotatable vehicle. The positive directions of the coordinate axes attached to the vehicle are given by the unit vectors $\bar{i}$, $\bar{j}$, and $\bar{k}$. Accordingly, the velocity vector may be written in terms of components in the vehicle coordinate system as $$\bar{V} = \bar{i}V_i + \bar{j}V_j + \bar{k}V_k \qquad (3)$$

where $$V_i = \bar{V} \cdot \bar{i}, \; V_j = \bar{V} \cdot \bar{j} \text{ and } V_k = \bar{V} \cdot \bar{k}$$

and consequently the time rate of change of the velocity vector with respect to inertial space is $$\frac{d\bar{V}}{dt} = \frac{d}{dt}(\bar{i}V_i) + \frac{d}{dt}(\bar{j}V_j) + \frac{d}{dt}(\bar{k}V_k)$$
$$= V_i \frac{d\bar{i}}{dt} + \bar{i}\frac{dV_i}{dt}$$
$$+ V_j \frac{d\bar{j}}{dt} + \bar{j}\frac{dV_j}{dt}$$
$$+ V_k \frac{d\bar{k}}{dt} + \bar{k}\frac{dV_k}{dt} \qquad (4)$$

by the usual rule for differentiation of a product. The time rate of change of a unit victor arises only from rotation of the unit vector. Also the direction of the rate of change must be normal both to the unit vector and to the instantaneous axis of rotation. Hence if $\bar{\omega}$ is the angular velocity of the vehicle coordinate system with respect to inertial space, the time rate of change of the unit vectors is given by the formulas $$\frac{d\bar{i}}{dt}=\omega\times\bar{i} \qquad (5a)$$

$$=(\bar{i}\omega_i+\bar{j}\omega_j+\bar{k}\omega_k)\times\bar{i}$$

$$=+\bar{j}\omega_k-\bar{k}\omega_j$$

$$\frac{d\bar{j}}{dt}=\omega\times\bar{j}=+\bar{k}\omega_i-\bar{i}\omega_k \qquad (5b)$$

and $$\frac{d\bar{k}}{dt}=\omega\times\bar{k}=+\bar{i}\omega_j-\bar{j}\omega_i \qquad (5c)$$

Substitution of the expression for the derivatives given by Equations 5 into Equation 4 gives after appropriate collection of terms $$\frac{d\bar{V}}{dt}=+\bar{i}\left(\frac{dV_i}{dt}+V_k\omega_j-V_j\omega_k\right) \qquad (6a)$$

$$+\bar{j}\left(\frac{dV_j}{dt}+V_i\omega_k-V_k\omega_i\right) \qquad (6b)$$

$$+\bar{k}\left(\frac{dV_k}{dt}+V_j\omega_i-V_i\omega_j\right) \qquad (6c)$$

But from Equation 2, it is evident also that $$\frac{d\bar{V}}{dt}=+\bar{i}a_i+\bar{j}a_j+\bar{k}a_k \qquad (7)$$

Since the corresponding components of two equal vectors are also equal, Equations 6 and 7 are equivalent to the three scalar equations $$a_i=\frac{dV_i}{dt}+V_k\omega_j-V_j\omega_k \qquad (8a)$$

$$a_j=\frac{dV_j}{dt}+V_i\omega_k-V_k\omega_i \qquad (8b)$$

$$a_k=\frac{dV_k}{dt}+V_j\omega_i-V_i\omega_j \qquad (8c)$$

Use of the expressions given by Equations 8 in Equation 1 gives for the specific force components $$f_i=a_i-g_i=\frac{dV_i}{dt}+V_k\omega_j-V_j\omega_k-g_i \qquad (9a)$$

$$f_j=a_j-g_j=\frac{dV_j}{dt}+V_i\omega_k-V_k\omega_i-g_j \qquad (9b)$$

$$f_k=a_k-g_k=\frac{dV_k}{dt}+V_j\omega_i-V_i\omega_j-g_k \qquad (9c)$$

If Equations 9 are integrated with respect to time between the limits 0 and $t$, expressions are obtained which are equivalent to the respective outputs of the integrating gyro accelerometers, namely, $$\int_0^t f_i(\tau)d\tau=\Delta V_i+\int_0^t V_k\omega_j d\tau-\int_0^t V_j\omega_k d\tau-\int_0^t g_i d\tau \qquad (10a)$$

$$\int_0^t f_j(\tau)d\tau=\Delta V_j+\int_0^t V_i\omega_k d\tau-\int_0^t V_k\omega_i d\tau-\int_0^t g_j d\tau \qquad (10b)$$

$$\int_0^t f_k(\tau)d\tau=\Delta V_k+\int_0^t V_j\omega_i d\tau-\int_0^t V_i\omega_j d\tau-\int_0^t g_k d\tau \qquad (10c)$$

The quantities which are desired are $\Delta V_i$, $\Delta V_j$, and $\Delta V_k$, namely, the components of the change of vehicle velocity vector with respect to inertial space in the vehicle coordinate system from the initial velocity at time $t=0$, to the current time $t$.

The outputs of the stabilization gyro units, as described elsewhere, are the angular displacements $\Delta\phi_i$, $\Delta\phi_j$, and $\Delta\phi_k$, respectively, where $$\Delta\phi_i=\int_0^t \omega_i d\tau;\ d(\Delta\phi_i)=\omega_i d\tau \qquad (11a)$$

$$\Delta\phi_j=\int_0^t \omega_j d\tau;\ d(\Delta\phi_j)=\omega_j d\tau \qquad (11b)$$

$$\Delta\phi_k=\int_0^t \omega_k d\tau;\ d(\Delta\phi_k)=\omega_k d\tau \qquad (11c)$$

Use of the relations of Equations 11 in Equations 10 gives $$\Delta V_i=\int_0^t f_i d\tau+\int_0^t g_i d\tau+\int_0^t V_j d(\Delta\phi_k)-\int_0^t V_k d(\Delta\phi_j) \qquad (12a)$$

$$\Delta V_j=\int_0^t f_j d\tau+\int_0^t g_j d\tau+\int_0^t V_k d(\Delta\phi_i)-\int_0^t V_i d(\Delta\phi_k) \qquad (12b)$$

$$\Delta V_k=\int_0^t f_k d\tau+\int_0^t g_k d\tau+\int_0^t V_i d(\Delta\phi_j)-\int_0^t V_j d(\Delta\phi_i) \qquad (12c)$$

where the first term on the right-hand side is the integrating gyro accelerometer output, the second term is the unsensed gravitational attraction correction, and the third and fourth terms are corrections due to the angular rotation of the accelerometer measuring axes perpendicular to their respective directions. The sum of the first two terms on the right-hand side gives, referring to Equation 1, the time integral of linear acceleration in the measuring direction.

The differentials 45 and 46 are provided in series connection on shaft 47 to receive the increment of velocity component $$\int_0^t f_i d\tau$$

as corrected for gravity effect $$\int_0^t g_i d\tau$$

in differential 40 and the appropriate integrals from the integration section in box 1 which contains six variable speed devices given reference numerals 50, 51, 52, 53, 54 and 55. In accordance with Equation 12a the discs of the devices 52 and 54 are driven by the outputs of gyros 14 and 15 on shafts 57 and 58, respectively, as by means of spur gearing as shown. The ball carriages of the devices 52 and 54 are positioned, by means of a pinion and rack or lead screw not shown, with distance from the disc center representing the vehicle velocity components with respect to inertial space along the $\bar{j}$ and $\bar{k}$ axes and being also represented by rotations of shafts 60 and 61 as hereinafter explained.

The differentials 45 and 46 combine the outputs of the two devices 52 and 54 receiving them on shafts 63 and 64 which are respectively connected to the rollers of the two devices. Shaft 65 feeds the differential output to another differential 66 where the initial value of inertial space velocity component is added to the inertial velocity increment to give the total component of vehicle inertial space velocity along the $i$ axis of the vehicle coordinate system. The added quantity is a constant of integration placed into one side of differential 66 by a handcrank usually at the start of operations to match the velocity to initial velocity. Shaft 67 receives the output of differential 66 and feeds it back into the integration section on shaft 76 and into other sections of the computer to be described.

Similarly, in accordance with Equation 12b differentials 68 and 69 are provided to receive the gravity corrected increment of velocity component in the vehicle system, $$\int_0^t f_i d\tau + \int_0^t g_i d\tau$$

represented on shaft 70 and combine the appropriate outputs generated in the integrator section. Accordingly, the discs of variable speed devices 50 and 55, are respectively driven in accordance with the rotational output of gyro 13 on shaft 72 and the output of gyro 15 on shaft 58 and the ball carriages of the devices 50 and 55 are respectively positioned by means of shaft 74 which is connected to shaft 61, which is operatively driven by the shaft 94, and shafts 75 and 76 which are operatively driven by shaft 67. The differentials 68 and 69 are connected to receive the roller output from the devices 50 and 55 by means of shafts 78 and 79, respectively, and their incremental output is fed to differential 80 the other input side of which is set as by a handcrank to introduce a constant of integration as in differential 66. An inertial velocity component $V_j$ in the vehicle coordinate system is obtained on shaft 82 as an output of the differential 80 and is similarly fed back into the integration section on the shaft 60 and to other sections of the computer.

Finally, differentials 84 and 85 are connected to receive the output of differential 42 on shaft 86 and the integrated outputs from variable speed devices 51 and 53. The ball carriage of variable speed device 51 is positioned by the value for $V_j$ appearing on shaft 60 and this quantity is integrated with respect to the quantity $\Delta\phi_1$ on shaft 72 which is employed to drive the disc of the device. The ball carriage of variable speed device 53 is positioned by shaft 76 on which there is continuously placed the value of $V_i$ and this quantity is integrated with respect to the angular quantity $\Delta\phi_j$ appearing on shaft 57 which is employed to drive the disc of the device 53. Shafts 88 and 89 connect the rollers of the devices 51 and 53 to the differentials 84 and 85, respectively, and combine their integrated outputs in accordance with Equation 12c. One side of differential 92 receives the incremental output of the differentials 84 and 85 on shaft 93 and on the manual introduction of an integration constant by a handcrank into the other side of the differential 92, the latter converts the incremental components of vehicle inertial velocity to a linear velocity component on the $\bar{k}$ axis in the vehicle coordinate system. Shaft 94 conveys this component to shaft 61 as a feed back to the other sections of the computer.

The vehicle inertial velocity components in the vehicle coordinate system are resolved into components in a selected reference system of coordinates having axes $\bar{m}$, $\bar{p}$ and $\bar{q}$ which are mutually established at right angles to each other. This system conforms to an earth centered coordinate system with the $\bar{p}$ axis aligned with the axis of rotation of the earth and the other two axes disposed in the plane of the earth's equator.

The resolution of the velocity components in the selected reference system is effected by means of the nine direction cosines $\bar{p}\cdot\bar{i}$, $\bar{p}\cdot\bar{j}$, $\bar{p}\cdot\bar{k}$, $\bar{q}\cdot\bar{i}$, $\bar{q}\cdot\bar{j}$, $\bar{q}\cdot\bar{k}$, $\bar{m}\cdot\bar{i}$, $\bar{m}\cdot\bar{j}$ and $\bar{m}\cdot\bar{k}$. Direction cosines are scalar quantities used to angularly relate corresponding axes of two displaced coordinate systems and are in fact the cosine of the angles between the corresponding axes. The direction cosines are obtained as the components of unit vectors stabilized in the vehicle system of coordinates by means of the integrator arrangement shown in box 2, box 2$^a$ and box 2$^b$. The elements in each of these boxes constitute a vector stabilizing system. The connections are identical in the three boxes and therefore a description of the arrangement in box 2 will suffice for the other two with the exceptions explained above.

The integrators in box 2 are six in number and are arranged in precisely the same fashion as the integrators in box 1. These integrators function to stabilize the unit vector $\bar{p}$ in the vehicle coordinate system so as to maintain a continuing generation of the components of this unit vector in the coordinate system of the vehicle while the system is in motion with respect to the inertial system of coordinates related to the earth. The components of the non-rotating unit vector $\bar{p}$ in the rotatable vehicle coordinate system are the direction cosines $\bar{p}\cdot\bar{i}$, $\bar{p}\cdot\bar{j}$, and $\bar{p}\cdot\bar{k}$. The time rate of change of the component $\bar{p}\cdot\bar{i}$ is given by $$\frac{d}{dt}(\bar{p}\cdot\bar{i}) = \left(\frac{d\bar{p}}{dt}\right)\cdot\bar{i} + \bar{p}\cdot\left(\frac{d\bar{i}}{dt}\right)$$

But $$\frac{d\bar{p}}{dt} = 0$$

since $\bar{p}$ is a non-rotating unit vector, and $$\frac{d\bar{i}}{dt} = \bar{\omega}\times\bar{i}$$
$$= +\bar{j}\omega_k - \bar{k}\omega_j$$

as given by Equations 5. Therefore, $$\frac{d}{dt}(\bar{p}\cdot\bar{i}) = \bar{p}\cdot(\bar{j}\omega_k - \bar{k}\omega_j)$$
$$= (\bar{p}\cdot\bar{j})\omega_k - (\bar{p}\cdot\bar{k})\omega_j \quad (13)$$

Similarly, the time rate of change of the direction cosines $\bar{p}\cdot\bar{j}$ and $\bar{p}\cdot\bar{k}$ is given by $$\frac{d}{dt}(\bar{p}\cdot\bar{j}) = (\bar{p}\cdot\bar{k})\omega_i - (\bar{p}\cdot\bar{i})\omega_k \quad (14)$$

$$\frac{d}{dt}(\bar{p}\cdot\bar{k}) + (\bar{p}\cdot\bar{i})\omega_j - (\bar{p}\cdot\bar{j})\omega_i \quad (15)$$

When Equations 13, 14 and 15 are integrated with respect to time, and when use is again made of the substitutions of Equations 11, the resulting equations, which are mechanized in box 2, are $$(\bar{p}\cdot\bar{i}) = (\bar{p}\cdot\bar{i})_0 + \int_0^t (\bar{p}\cdot\bar{j})d(\Delta\phi_k) - \int_0^t (\bar{p}\cdot\bar{k})d(\Delta\phi_j) \quad (16)$$

$$(\bar{p}\cdot\bar{j}) = (\bar{p}\cdot\bar{j})_0 + \int_0^t (\bar{p}\cdot\bar{k})d(\Delta\phi_i) - \int_0^t (\bar{p}\cdot\bar{i})d(\Delta\phi_k) \quad (17)$$

$$(\bar{p}\cdot\bar{k}) = (\bar{p}\cdot\bar{k})_0 + \int_0^t (\bar{p}\cdot\bar{i})d(\Delta\phi_j) - \int_0^t (\bar{p}\cdot\bar{j})d(\Delta\phi_i) \quad (18)$$

where $(\bar{p}\cdot\bar{i})_0$, $(\bar{p}\cdot\bar{j})_0$, and $(\bar{p}\cdot\bar{k})_0$ are values of the direction cosines at the start of operations. The equations mechanized in boxes 2$^a$ and 2$^b$ are obtained by replacing the unit vector $\bar{p}$ in Equations 16, 17 and 18 by the unit vectors $\bar{q}$ and $\bar{m}$ respectively.

Therefore, in accordance with Equation 16 the ball carriage of variable speed device 104 is positioned in accordance with the quantity $\bar{p}\cdot\bar{j}$ appearing on output shaft 106 and shaft 107 to which the carriage is connected. The disc of the device 104 is driven in accordance with the angular quantity $\Delta\phi_k$ on shaft 108 and connected shaft 109 which receives the output of gyro 15. The roller output of the device 104 is conveyed to differential 110 which combines the output with that of variable speed device 102. The disc of the latter is driven in accordance with the quantity $\Delta\phi_j$ appearing on shaft 112 which is connected to shaft 114 which receives the angular output of the gyro 14. The ball carriage of the device 102 is positioned in accordance with the quantity $\bar{p}\cdot\bar{k}$ appearing on shaft 126 which is connected to output shaft 127. The combined output of the devices 102 and 104 is placed on differential shaft 115 of differential 110 which leads to an input side of differential 116. The initial value of the direction cosine $\bar{p}\cdot\bar{\imath}$ at the start of operation may be cranked into the other input side of differential 116 which has an output shaft 118.

The differential output on the shaft 118, which is connected to output shaft 120, is employed to position the ball carriage of variable speed device 105 the disc of which is driven by the shaft 108 and the shaft 109. Shaft 122 is in operative connection with shaft 124 which receives the output of gyro 13 and is employed to drive the disc of the device 100. The ball carriage of the variable speed device 100 is positioned by shaft 125 which is connected to the output shaft 126 for the direction cosine quantity $\bar{p}\cdot\bar{k}$. In the device 100 the quantity $\bar{p}\cdot\bar{k}$ is integrated with respect to $\Delta\phi_i$. The output of the device 100 on shaft 130 is combined with the output of the device 105 on shaft 132 in differential 134 and the combined output is placed into one side of differential 136 into the other side of which the initial value of component $\bar{p}\cdot\bar{\jmath}$ is placed in the same manner as in differential 116. The output of differential 136 leads to connected shafts 138 and 107 to which shaft 106 is connected to satisfy Equation 17.

Shaft 107 is also employed to position the ball carriages of variable speed devices 101 and 104. The disc of the device 101 is driven by the shafts 122 and 124 and hence the device is adapted to integrate the direction cosine $\bar{p}\cdot\bar{\jmath}$ with respect to $\Delta\phi_i$. Shaft 118 is connected to shaft 140 which positions the ball carriage of variable speed device 103 in accordance with the direction cosine $\bar{p}\cdot\bar{\imath}$. The disc of the device 103 is driven by shaft 112 connected to shaft 114 being thus adapted to deliver the quantity $\Delta\phi_j$ thereto. The output of the devices 101 and 103 is conveyed to differential 142 by means of shafts 143 and 144, respectively, and the combined output is placed into differential 145 which is adapted to receive the initial value of the direction cosine $\bar{p}\cdot\bar{k}$, the differential 145 being identical in function to differentials 116 and 136. The output of differential 145 is placed on output shaft 127 in accordance with Equation 18.

As has been noted the integrator arrangements in box 2$^a$ and box 2$^b$ are the same as in box 2. In operation they stabilize unit vectors in the vehicle coordinate system for the $\bar{q}$ and $\bar{m}$ coordinates in the inertial referencing system. Essentially, however, all three integrator sections perform the same function which is to establish $\bar{p}$, $\bar{q}$ and $\bar{m}$ unit vectors by means of the direction cosines in the vehicle coordinate system.

Output shafts 106, 120 and 127 are connected into potentiometers 150, 151 and 152, respectively, in the component resolver section of box 3 where the component velocities obtained in box 1 are resolved into components in the inertial reference system by means of the direction cosines, which are fed into this section from box 2. To this end the potentiometers 150, 152 and 151 are energized by potentiometers 154, 155 and 153, respectively, whose output is controlled by the shafts 82, 94 and 67 and driven shafts 157, 158 and 156, respectively, which are connected to the movable wipers of the potentiometers. Amplifiers 160, 161 and 162 are connected to receive the output of potentiometers 153, 154 and 155, respectively, and their output is connected to the potentiometers 151, 150 and 152, respectively. Series electrical differentials 164 and 165 are connected to the potentiometers 150, 151 and 152 to combine their outputs and the combined output is fed to a servo motor 168. The electrical differentials 164 and 165, together with the connected servo 168, are components of a servo loop with the return or feedback connections implicit in the servo connection. A variable speed device 169 is connected to the servo 168 by shaft 170 which positions the ball carriage of the device. A time motor (not shown) drives the disc of the device 169 which is thereby enabled to integrate the velocity component along the $\bar{p}$ axis so as to yield the increment of distance $\Delta D_p$ which after addition of the initial value of the quantity $D_p$ at the start of operation in differential 177$^a$ is the instantaneous position $D_p$ of the vehicle along the $\bar{p}$ axis.

The shafts 67, 82 and 94 connect into potentiometers corresponding to potentiometers 153, 154 and 155 in box 3$^a$ and box 3$^b$ the elements of which are identical to those contained in box 3. Shafts 170$a$, 171 and 172 feed direction cosines $\bar{q}\cdot\bar{\imath}$, $\bar{q}\cdot\bar{\jmath}$ and $\bar{q}\cdot\bar{k}$, respectively, into box 3$^a$ and shafts 173, 174 and 175 feed direction cosines $\bar{m}\cdot\bar{\imath}$, $\bar{m}\cdot\bar{\jmath}$ and $\bar{m}\cdot\bar{k}$, respectively, into box 3$^b$. In box 3$^a$ and box 3$^b$, therefore, the velocity components $V_i$, $V_j$ and $V_k$ are resolved into velocity components $V_q$ and $V_m$, respectively, which are integrated to produce the distances $D_q$ and $D_m$, respectively, as in box 3, where $V_q$ and $V_m$ are components of vehicle inertial space velocity along the $q$ and $m$ axes of the $p$, $m$, $q$ reference system and $D_q$ and $D_m$ are the instantaneous positions of the vehicle along the $q$ and $m$ axes of the reference system.

The quantity $D_p$ obtained in box 3 is fed to a referencing potentiometer 176 by means of shaft 177 and initial setting differential 177$^a$. The output of the potentiometer 176 is amplified by amplifier 180. The quantity $D_q$ generated in box 3$^a$ is fed to potentiometer 181 by means of shaft 182 and the quantity $D_m$ from box 3$^b$ is fed to potentiometer 183 by means of shaft 184. Amplifiers 185 and 186 are connected to receive the output of the potentiometers 181 and 183, respectively, and the output of both amplifiers is employed to energize resolver 188. Servo 190 is powered by the error signal output of resolver 188 being connected thereto by a lead 192 and feed back shaft 194. It should be noted, therefore, that the electrical output of the resolver 188 on line 192 serves to drive the servo 190, the output of which on feedback shaft 194 is employed to rotate the rotor of the resolver until a null is produced on line 192 in a well-known manner. Shaft 195 is also connected to the output of the servo motor 190 and to an input side of differential 196. This generated quantity representing increment of longitude in the inertial reference system is converted to earth longitude by means of clock 198 which is connected to differential 196 by means of shaft 199.

The resolver 188 is also connected to amplifier 200 by means of lead 201. A lead 203 connects the amplifier 200 to resolver 202 which is employed to power the servo motor 204, by means of lead 205, the servo having a feed back connection 206 to the resolver 202 and an output shaft 207 on which appear quantities representing earth latitude.

Having obtained the latitude and longitude, a gravity vector is resolved through the same angles to give its components in the vehicle coordinate system by mechanism which will now be described.

Shafts 208 and 209 connect, respectively, the shafts 207 and 195 to angle resolver 211 and resolver 210 which is connected to one output of resolver 211 by lead 212, amplifier 213 and lead 214. Leads 215 and 216 connect the resolver 210 to amplifiers 218 and 219, respectively, and lead 220 connects the other output of resolver 211 to amplifier 221. The output of the amplifiers 219, 218 and 221 represent gravity components $\bar{g}\cdot\bar{m}$, $\bar{g}\cdot\bar{q}$ and $\bar{g}\cdot\bar{p}$ respectively, in the inertial reference system which are the components of the gravity vector $\bar{g}$ along the $m$, $q$ and $p$ axes, respectively.

The elements in box 4 are employed to convert the components in the inertial reference system to components in the moving vehicle system. To this end potentiometer shafts 222, 223 and 224 are connected to shafts 120, 170$a$ and 173 whereby the direction cosines $\bar{p}\cdot\bar{\imath}$, $\bar{q}\cdot\bar{\imath}$ and $\bar{m}\cdot\bar{\imath}$ are fed to potentiometers 225, 226 and 227 in box 4. Gravity components in the inertial reference system are conveyed to the potentiometers by amplifier connections 230, 231 and 232 and leads 234, 235 and 236, respectively. Series electrical differentials 237 and 238 are connected to receive the output of potentiometers 225, 226 and 227 by means of leads 240, 241, and 242, respectively. The combined components of gravity in the vehicle coordinate system are fed to integrator 244 by means of servo 245 and the component is integrated with respect to time, the time motor for driving the disc of integrator 244 not being shown. The integrator output represents the resultant change in velocity due to gravity along the $\bar{i}$ axis of the vehicle coordinate system, i.e., $$\int_0^t g_i d\tau$$

and is used to correct the accelerometer output for this effect. Shaft 248 connects the roller of integrator 244 to differential 40 so that the correction value $$\int_0^t g_i d\tau$$

for the velocity component along the $\bar{i}$ axis in the vehicle coordinate system may be used to modify the output of accelerometer 10.

Similarly box 4$^a$ and box 4$^b$ are provided to generate correction factors $$\int_0^t g_j d\tau$$

and $$\int_0^t g_k d\tau$$

for gravity effect on the velocity componets along the $\bar{j}$ and $\bar{k}$ axes, respectively, of the vehicle coordinate system and are therefore connected to leads 230, 231 and 232 to receive the gravity components in the inertial reference system as indicated in FIG. 1. Potentiometer shafts 254, 255 and 256 are driven by shafts 106, 171 and 174, respectively, through connections (not shown) to feed the direction cosines $\bar{p}\cdot\bar{j}$, $\bar{q}\cdot\bar{j}$, and $\bar{m}\cdot\bar{j}$, respectively, to box 4$^a$ and similarly potentiometer shafts 258, 259 and 260 are driven by shafts 127, 172 and 175, respectively, through connections (not shown) to introduce the direction cosines $\bar{p}\cdot\bar{k}$, $\bar{q}\cdot\bar{k}$ and $\bar{m}\cdot\bar{k}$, respectively, to box 4$^b$. Shafts 250 and 252 connect the integrated outputs in boxes 4$^a$ and 4$^b$ to differentials 41 and 42, respectively, so that the output of accelerometers 11 and 12 may be similarly corrected for gravity effect.

The described computer represents a preferred embodiment of the invention and may be modified by one skilled in the art without departing from the principles and scope of the invention as defined in the appended claims.

What is claimed is:

1. An inertial navigation computer for a vehicle having three mutually orthogonal axes comprising an integrating accelerometer mounted along each of said axes and adapted to measure an increment of velocity component along each axis, a gyro mounted along each of said axes, means connecting axially corresponding gyros and accelerometers for correcting the increment of velocity components measured by the accelerometers for the rotation of said axes, means connected to said first mentioned means for resolving the corrected increment of velocity components into components in a reference system of coordinates having an axis corresponding to the polar axis of the earth and a pair of mutually perpendicular axes disposed in the earth's equatorial plane and means responsive to the latter increment of velocity components for deriving positional values therefrom.

2. An inertial navigation computer as claimed in claim 1 wherein means are provided for determining gravity effect from said positional values and for correcting the output of the integrating accelerometers in accordance therewith.

3. An inertial navigation computer as claimed in claim 1 wherein the integrating accelerometers and gyros mounted separately on each measuring axis of the vehicle have a gyro frame mounted to rotate with unlimited freedom about said measuring axis and a gyro wheel case mounted to rotate with limited angular freedom about an axis of the frame perpendicular to the measuring axis.

4. An inertial navigation computer for a vehicle having a vehicle coordinate system composed of three mutually orthogonal axes comprising an integrating accelerometer mounted along each of said axes and adapted to measure an increment of velocity component of the vehicle along each axis, a gyro similarly mounted along each of said axes and adapted to measure the rotation of the vehicle about each axis during flight, means connecting the output of the gyros and accelerometers for correcting the accelerometer output for rotation of the axes, means connected to said gyros and accelerometers for resolving the increment of velocity components along said axes into inertial components in said vehicle coordinate system, means connected to said gyros for determining direction cosines obtained as components of a unit vector stabilized in the vehicle system and means connected to said direction cosine determining means and increment velocity resolving means for converting the increment of velocity components determined by the latter means into velocity components in the reference system of coordinates having an axis corresponding to the polar axis of the earth and two mutually perpendicular axes disposed in the equatorial plane.

5. An inertial navigation computer as claimed in claim 4 wherein means are provided for determining gravity effect from the velocity components in the reference system and for correcting the output of the integrating accelerometers in accordance therewith.

6. An inertial navigation computer as claimed in claim 5 wherein the integrating accelerometers and gyros mounted separately on each measuring axis of the vehicle have a gyro frame mounted to rotate with unlimited freedom about said measuring axis and a gyro wheel case mounted to rotate with limited angular freedom about an axis of the frame perpendicular to the measuring axis.

7. An inertial navigation computer as claimed in claim 5 wherein the means for resolving the increment of velocity components along said axes into inertial components in said vehicle coordinate system comprises a group of six variable speed devices having discs, and ball carriages radially positionable over the surface of said discs, the ball carriages of each pair of said devices being positioned by the combined output of an accelerometer and another pair of said devices and the gyro frame of each of the three gyros being separately connected to the discs of two of said devices.

8. An inertial navigation computer as claimed in claim 6 wherein the means for determining direction cosines as components of each unit vector comprises an integrator section, said integrator section having three pairs of variable speed devices having discs, rollers and ball carriages radially positionable between said discs and said rollers, the discs of each pair of devices in the integrator section being connected to the gyro frame of one of the gyros and the ball carriages of each device being positioned by the combined roller output of two other devices, there being provided separate manual means for setting the position of said carriages.

9. An inertial navigation computer as claimed in claim 8 wherein the means for converting the inertial increment of velocity components in the vehicle coordinate system into increment of velocity components in the reference system comprises three units, each of the said units having resolving means for receiving separately direction cosine components of a unit vector in the reference system and the three increment of velocity inertial components in the vehicle coordinate system and resolving the latter components into the three components of increment velocity in the reference system, each unit having a variable speed device connected to said resolving means for continuously deriving increments of distance.

10. A computer for determining direction cosines obtained as components of a unit vector stabilized in a vehicle coordinate system, said computer comprising three similar gyros each of which has an outer frame the rotative axes of which is mounted along a different one of three mutually perpendicular axes of a vehicle and are operative to measure in the vehicle coordinate system the degree of rotation of each axis of the vehicle during flight, a vector stabilizing system which includes an integrator section comprising three pairs of similar variable speed devices each of which comprises a disc, a roller, the rotation of which yields the output of said device and a ball carriage positionable over the surface of said disc, connecting means between the gyro frame of each of said gyros and a different pair of variable speed devices through which the discs of each pair of variable speed devices are driven in unison, respectively by their connected gyro, and means through which the ball carriage of each of said variable speed devices is positioned by the combined roller output of two other of said variable speed devices, whereby the output of said integrator section represents direction cosine quantities for transforming component vectors from the vehicle coordinate system to another coordinate system.

References Cited in the file of this patent

UNITED STATES PATENTS

| | | |
|---|---|---|
| 2,224,182 | Crooke | Dec. 10, 1946 |
| 2,403,542 | Newell | July 9, 1946 |